United States Patent Office 3,840,638
Patented Oct. 8, 1974

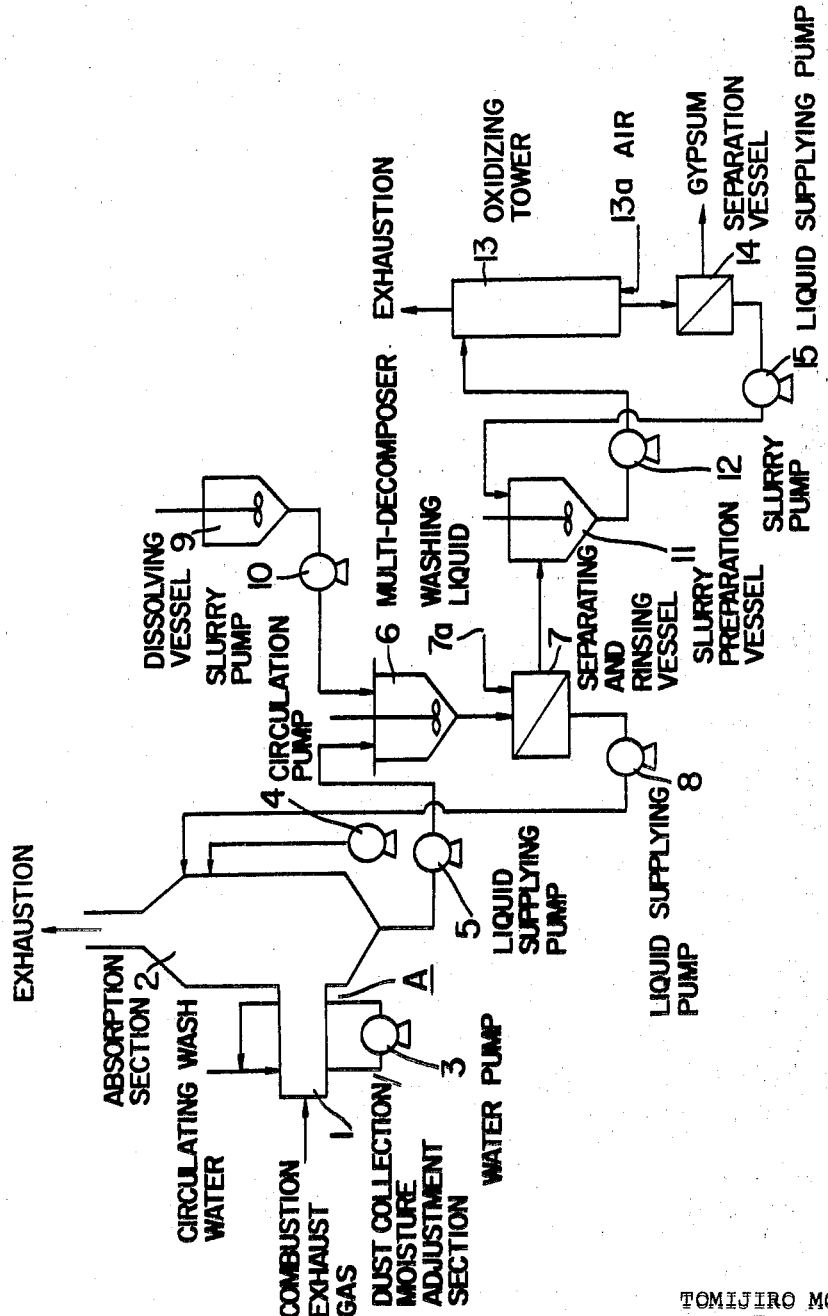

3,840,638
PRODUCTION OF GYPSUM FROM COMBUSTION EXHAUST GAS
Tomijiro Morita, Isao Funabashi, and Masayoshi Sugai, Iwaki, Japan, assignors to Kureha Kagaku Kogyo Kabushiki Kaisha, Tokyo-to, Japan
Filed Oct. 26, 1971, Ser. No. 192,231
Claims priority, application Japan, Oct. 26, 1970, 45/94,125
Int. Cl. C01f 1/00, 11/46
U.S. Cl. 423—166     1 Claim

ABSTRACT OF THE DISCLOSURE

Process for producing gypsum from combustion exhaust gas by contact-reacting the gas with alkali sulfite to produce acidic alkali sulfite, then reacting acidic alkali sulfite with calcium carbonate or hydroxide to obtain calcium sulfite, and oxidizing calcium sulfite.

---

This invention relates to a method for producing gypsum, or, more particularly, to a method for producing gypsum which has recently become highly demanded by absorbing and fixing oxide of sulfur contained in combustion exhaust gas in the form of acidic alkali sulfite, then turning it into calcium sulfite by reacting with calcium carbonate or hydroxide, and oxidizing calcium sulfite.

Strenuous efforts have been made in recent days to develop techniques of treating exhaust gas dicharged from various plants and factories such as thermal power plant not only to make it inoxious with a view to reducing air pollution which has been one of the most serious problems over the world, but also to produce useful substances by positively utilizing the gas as the raw material in chemical industries. For these reasons, however, that exhaust gas from such plants and factories contains low concentration of the oxide of sulfur and that the quantity of the exhaust gas to be treated is enormous, desulfurization technique of the exhaust gas in industrialized scale has still been under study and development.

As the method of producing gypsum from exhaust gas containing oxide of sulfur, there has been known from old various ones such that calcium hydroxide or calcium carbonate is reacted with sulfur dioxide to turn it into calcium sulfite, which is then oxidized, or calcium carbonate in powder form is dispersed in the exhaust gas to cause it to react with the coexistent oxygen, thereby obtaining gypsum.

These known methods, however, are still not free from difficulty in practice. That is, in the former method, absorption should be done in slurry form, which causes clogging and scaling of the absorption tower, and the latter method possesses problems such as blocking of the reaction tower, recovery of product, and so forth. In particular, clogging of the absorption tower constitutes a fatal defect in the desulfurizing apparatus.

It is therefore the primary object of the present invention to provide an improved method of producing gypsum from combustion exhaust gas from plants and factories without causing clogging of the absorption tower.

It is another object of the present invention to provide an improved method of producing gypsum by contacting the combustion exhaust gas with alkali sulfite to fix sulfur dioxide in the gas in the form of acidic alkali sulfite, then causing acidic alkali sulfite to react with calcium hydroxide or calcium carbonate to produce calcium sulfite and alkali sulfite, and oxidizing the separated calcium sulfite in slurry form with a small quantity of air.

The above objects as well as the details of the present invention will become more apparent from the following description when read in connection with a preferred embodiment thereof and an accompanying drawing.

In the drawing, the single figure is a schematic diagram showing the process steps of producing gypsum according to the present invention.

In developing the technique of producing gypsum from combustion exhaust gas, the following matters were kept in mind: (1) the absorption tower should not be blocked; (2) water for processing the material should be well balanced; and (3) purity and crystal shape of the resultant gypsum is sufficiently good, as the result of which it has been noted that acidic alkali sulfite readily reacts with calcium carbonate or calcium hydroxide to turn into calcium sulfite and alkali sulfite.

The detailed process steps of producing gypsum according to the present invention will be described hereinbelow with reference to the drawing.

Combustion exhaust gas is first introduced into the dust-collection cum moisture-adjustment section of the absorption tower $\underline{A}$ where it is washed with water which is circulated by a water pump 3 to remove carbon and other fine particles accompanying the gas, and, at the same time, is adjusted its temperature at a level of from 80 to 90° C. and its relative humidity in a range of from 15% to 60%. If the temperature of the exhaust gas is below this lower limit, evaporation of moisture in the gas at the absorption section 2 of the absorption tower $\underline{A}$ is poor. On the other hand, if the temperature is above the upper limit, absorption of sulfur dioxide becomes inferior. Also, with the relative humidity of below 15%, the dust collection is not so effective, and the humidity of above 60% disadvantageously affects concentration of the acidic alkali sulfite solution.

The exhaust gas which has been thus dust-collected, moisture-adjusted, and temperature-lowered is subsequently sent into the absorption section 2 of filling type. In this absorption section 2 sulfur dioxide contained in the exhaust gas is caused to react, through a gas/liquid phase contact, with approximately 20% aqueous solution of alkali sulfite such as sodium sulfite or potassium sulfite sent into the absorption section 2 from the upper part thereof by means of a circulating pump 4 and a liquid supplying pump 8, and is absorbed and fixed in the form of acidic alkali sulfite. Upon the contact reaction, both acidic alkali sulfite and alkali sulfite are concentrated by heat energy of the exhaust gas, and they are sent into a double decomposition reactor 6 in the subsequent step by means of a liquid supplying pump 5 in the form of approximately 8% aqueous solution of acidic alkali sulfite and approximately 15% aqueous solution of alkali sulfite.

In this double decomposition reactor, the acidic alkali sulfite solution reacts with calcium carbonate or calcium hydroxide in slurry form prepared in a dissolving vessel 9 and sent into the reactor 6 by a slurry pump 10 at a temperature of from 50 to 90° C. to produce calcium sulfite. In case of using calcium carbonate, carbon dioxide generated from the reaction should be discharged outside the reactor, or transferred to a process system which utilizes carbon dioxide as the raw material.

Calcium sulfite crystal and alkali sulfite produced in the double decomposition reactor 6 are then separated in a separating and rinsing vessel 7, and the alkali sulfite solution is fed back to the absorption section 2 of the absorption tower $\underline{A}$ together with washing liquid 7a by means of the liquid supplying pump 8. On the other hand, calcium sulfite rinsed in the separating and rinsing vessel 7 is transferred into a slurry preparation vessel 11 where it is made into approximately 5% slurry of calcium sulfite, and then sent into the top part of an oxidizing tower 13 by means of a slurry pump 12. While the slurry is being charged into the oxidizing tower and falling downward to the bottom of the tower dispersing therewithin, air 13a is blown into the oxidizing tower from the bottom thereof, which reacts with the calcium sulfite slurry to produce oxidized gypsum.

The gypsum thus produced is conveyed to a separation vessel 14 from the tower bottom, where the gypsum is separated in crystallized form, while filtered liquid is recirculated to the slurry preparation vessel 11 by a liquid supplying pump 15.

The process according to the present invention has remarkable advantages in that no clogging of the absorption tower occurs in the course of absorbing oxide of sulfur, alkali sulfite solution as the absorbing agent as well as water for preparing slurry of calcium sulfite can be recycled for repeated use, and balance of water for washing and slurry preparation can be adequately maintained to produce gypsum from combustion exhaust gas without much difficulty, hence its economical merit is considered great.

In order to enable skilled artisans to readily reduce this invention into practice, the following example is presented. It should however be noted that the invention is not so limited to this example alone, but any changes in the reaction conditions may be allowed within ambit of the disclosure as well as the scope of protection as recited in the appended claim.

EXAMPLE

Combustion exhaust gas at a temperature of 170° C. and containing 0.15% by volume of sulfur dioxide, 10% by volume of carbon dioxide, 4% by volume of oxygen, and 15% by volume of moisture was introduced into an absorption tower at a flowrate of 250 Nm.$^3$/hr. The gas was then washed with circulating water at a flowrate of 80 l./hr. at the dust-collection cum moisture-adjustment section in the absorption tower so as to maintain its temperature at 90° C. and its relative humidity at 32%. The rate of the dust collection was 60%.

The dust-collected, moisture-adjusted gas was subsequently reacted in the absorption section of the tower, wherein 47 kg./hr. of absorbing liquid consisting of 18% by weight of sodium sulfite maintained at a temperature of 60° C. was being dispersed downward from a disperser provided at the top of the absorption tower, to cause sulfur dioxide contained in the combustion exhaust gas to be absorbed and fixed, and simultaneously to evaporate 7.2 kg./hr. of moisture from the gas. As the result of this absorption reaction, 8% by weight of acidic sodium sulfite and 41 kg./hr. of solution containing 15% by weight of sodium sulfite were obtained. The exhaust gas discharging out of the top portion of the absorption tower was found to be at 60° C. of temperature, almost saturated in humidity, to have a sulfur dioxide concentration of 0.0083% by volume, and an absorption rate of sulfur dioxide of 94.6%.

Next, the solution of acidic sodium sulfite from the absorption tower was forwarded to a double decomposition reactor where it was reacted with 20% by weight slurry of calcium hydroxide at a temperature of 80° C., while agitating the batch, so as to bring the molar ratio of acidic sodium sulfite with respect to calcium hydroxide to be 2.2 mol./mo. as the result of which 2.4 kg. of calcium sulfite was obtained.

The reaction mixture was further transferred to a separating and rinsing vessel to sufficiently wash calcium sulfite with water of equivalent quantity, and filtered. The filtered liquid was an approximately 17.2% by weight solution of sodium sulfite, which was fed back to the absorption tower by a liquid supplying pump, wherein the solution was reused, upon evaporating 7.2 kg./hr. of water therefrom, for absorbing and fixing sulfur dioxide contained in the exhaust gas sent into the tower.

In the subsequent slurry preparation vessel, crystallized calcium sulfite was made into 5% by weight of slurry by adding water thereto, and then the slurry was sent into an oxidizing tower from the top thereof by means of a slurry pump, whereas a small quantity of air at a rate of 2 Nm.$^3$/hr. was blown into the tower from its bottom through a nozzle so as to carry out the oxidizing reaction at a temperature of 80° C. The reaction product was introduced into a separation vessel through the bottom part of the oxidizing tower, where it was dehydrated to produce gypsum dihydrate at a rate of 2.7 kg./hr. Gypsum thus obtained assumed planar crystal, and its purity was 98.4%.

The separated water was recirculated for adjustment of slurry of calcium sulfite.

What we claim is:

1. A process for producing gypsum from combustion exhaust gas which comprises steps of:

a. introducing high temperature combustion exhaust gas containing therein sulfur dioxide *and fine solid particles* into an absorbing device to lower the temperature thereof down to approximately 180° C. to 150° C., subsequently contacting the same with water to further lower the gas temperature to a range of from 95° C. to 80° C. simultaneously adjusting relative humidity thereof to a range of from 15% to 60% and thereby removing a substantial part of said fine particles;

b. contacting the thus temperature- and moisture-adjusted gas with solution of alkali sulfite selected from the group consisting of sodium sulfite and potassium sulfite to absorb and fix sulfur dioxide in said exhaust gas in the form of solution of acidic alkali sulfite;

c. causing said alkali sulfite solution to react with a substance selected from the group consisting of calcium carbonate and calcium hydroxide to produce crystals of calcium sulfite therefrom;

d. separating said calcium sulfite from said alkali sulfite solution, and washing the former with water; and e. making said calcium sulfite into a slurry, and contacting the same with a small quantity of air to oxidize the same to produce gypsum;

both alkali sulfite solution and water used for washing calcium sulfite as separated in the step d. being recycled for further use in absorbing and fixing of sulfur dioxide in the exhaust gas in the step b., and water mixed into the alkali sulfite solution in steps a., c., and d. being evaporated in step b. to balance the water content in the reaction system.

References Cited
UNITED STATES PATENTS

| | | | |
|---|---|---|---|
| 3,607,033 | 9/1971 | Shah | 23—178 X |
| 2,082,006 | 6/1937 | Johnstone | 23—122 X |
| 2,810,627 | 10/1967 | Johnstone et al. | 23—178 X |
| 2,086,379 | 7/1937 | Clark | 23—178 |

OSCAR R. VERTIZ, Primary Examiner

G. HELLER, Assistant Examiner

U.S. Cl. X.R.

423—242